(12) United States Patent
Kramer, Jr. et al.

(10) Patent No.: US 6,220,382 B1
(45) Date of Patent: Apr. 24, 2001

(54) POWERED WHEELCHAIR WITH SEPARATING FRAME

(75) Inventors: Duwayne E. Kramer, Jr., Lake Quivera; Jerry L. Traylor, Olathe; James Ernst, Kansas City, all of KS (US)

(73) Assignee: Burke Mobility Products, Inc., Kansas City, KS (US)

( * ) Notice: Subject to any disclaimer, the term of this patent is extended or adjusted under 35 U.S.C. 154(b) by 0 days.

(21) Appl. No.: 09/193,560

(22) Filed: Nov. 17, 1998

(51) Int. Cl.[7] ................................. B60K 1/02; B60K 1/04

(52) U.S. Cl. ............................................................ 180/65.5

(58) Field of Search ................................... 180/65.5, 907, 180/15, 16, 11; 280/250.1, 297; 403/109.4, 378, 379.3

(56) References Cited

U.S. PATENT DOCUMENTS

| D. 397,645 | | 9/1998 | Schaffner . | |
|---|---|---|---|---|
| 3,945,738 | * | 3/1976 | Bahnsen | 403/109 |
| 5,433,552 | * | 7/1995 | Thyu | 403/378 |
| 5,435,404 | | 7/1995 | Garin, III . | |
| 5,558,358 | * | 9/1996 | Johnson | 280/648 |
| 5,772,237 | | 6/1998 | Finch et al. . | |
| 5,848,658 | * | 12/1998 | Pulver | 180/65.1 |
| 5,904,214 | * | 5/1999 | Lin | 180/15 |
| 5,944,131 | * | 8/1999 | Schaffner et al. | 180/65.1 |
| 5,984,249 | * | 11/1999 | Cohen | 248/226.11 |

OTHER PUBLICATIONS

Chauffer Mobility Products, Viva Power Chair Owner's Manual, 24 pages, Rev. 02–Jan. 9, 1998.
Days Medical Aids Ltd, DMA Brochure, 2 pages, prior to Nov. 1998.
Everest & Jennings, The O.C. Flyer Brochure, 4 pages, prior to Nov. 1998.
Fortress, Mini Catalog, 4 pages, prior to Nov. 1993.
HomeCareXtra Catalog, pp. 32–34, Entitled, *Mobility Focus*, prior to Nov. 1998.
Hoveround Corporation, Hoveround Personal Mobility Vehicles MPV 4 Brochure, 2 pages, prior to Nov. 1998.
Hoveround Corporation, Hoveround Personal Mobility Vehicle Teknique Brochure, 2 pages, prior to Nov. 1998.
Invacare Corporation, Action Simply Smart, Simply Smart, PinDot, Storm Series, Action Arrow, Action Ranger X, Action Torque, Action Range II, and Action Allegro Brochure, 6 pages, 1997.

(List continued on next page.)

*Primary Examiner*—Brian L. Johnson
*Assistant Examiner*—Tony Winner
(74) *Attorney, Agent, or Firm*—Shook, Hardy & Bacon L.L.P.

(57) ABSTRACT

A powered wheelchair for disabled persons is provided that has a center frame that has a first end and a second end. The wheelchair further has a seat support coupled to the center frame between the first and second ends. A pair of rear stabilizing wheels is connected to the center frame near the first end. The wheelchair further includes a drive assembly that is removably coupled to the center frame near the second end. The drive assembly has a pair of drive wheels that each have a motor operably connected thereto. A coupling mechanism is associated with the frame and the drive assembly that removably couples the frame to the drive assembly. The coupling mechanism is applicable and releasable by hand without the use of any tools. A power source is removably held on the center frame generally between the first and second ends, and is electrically connected to each of the motors. A seat assembly is removably coupled to the seat support that extends upwardly above the center frame. Finally, a controller is provided that allows operation of the drive assembly to be controlled. The controller is removably coupled to the seat assembly.

11 Claims, 9 Drawing Sheets

OTHER PUBLICATIONS

Invacare Corporation, Action P7E Brochure, 2 pages, Form No. 97–251, 1997.

Invacare Corporation, Action Power 9000 Storm Series Brochure, 6 pages, Form No. 95–96, Nov. 1995.

Invacare Corporation, Action Storm Series Ranger X Brochure, 12 pages, Form No. 94–26 R020395, 1994.

Invacare Corporation, Action Storm Series Arrow & Torque Brochure, 20 pages, Form No. 94–09, 1994.

Leisure—Life, Inc., PaceSaver Sasso Power Chair Brochure, 2 pages, prior to Nov. 1998.

Permobil Inc, Chairman Corpus Brochure, 2 pages, prior to Nov. 1998.

Permobil Inc, Chairman Stander Brochure, 2 pages, prior to Nov. 1998.

Permobil Inc, Chairman MPS Brochure, 2 pages, prior to Nov. 1998.

Permobil Inc, Chairman Drivelink for Chairman Brochure, 2 pages, prior to Nov. 1998.

Permobil Inc, Chairman Miniflex Brochure, 2 pages, prior to Nov. 1998.

Permobil Inc, Chairman Mini Stander Brochure, 2 pages, prior to Nov. 1998.

Permobil Inc, Chairman Basic Brochure, 2 pages, prior to Nov. 1998.

Permobil Inc, The New Chairman Brochure, 2 pages, prior to Nov. 1998.

Permobil Inc, Chairman Robo For Kids Brochure, 2 pages, prior to Nov. 1998.

Pride Health Care, Inc., Jazzy Model 1100 Power Chair Brochure, 2 pages, prior to Nov. 1998.

Pride Health Care, Inc., Jazzy Model 1100 Power Chair Owner's Manual, 44 pages, prior to Nov. 1998.

Pride Health Care, Inc., Jazzy Model 1105 Power Chairs Brochure, 2 pages, prior to Nov. 1998.

Pride Health Care, Inc., Jazzy Model 1120 Power Chairs Brochure, 2 pages, prior to Nov. 1998.

Pride Health Care, Inc., Jazzy Model 1170 Power Chairs Brochure, 2 pages, prior to Nov. 1998.

Pride Health Care, Inc., Jazzy Power Chairs Brochure, 2 pages, prior to Nov. 1998.

Pride Health Care, Inc., Jazzy Power Chairs Brochure, 8 pages, prior to Nov. 1998.

Pride Health Care, Inc., Jazzy Power Chairs Brochure, 10 pages, prior to Nov. 1998.

Quickie Designs Inc., Quickie P210 Brochure, 2 pages, No. 903500, May 1995.

Quickie Designs Inc, Quickie P100/P110 Brochure, 2 pages, 1996.

* cited by examiner

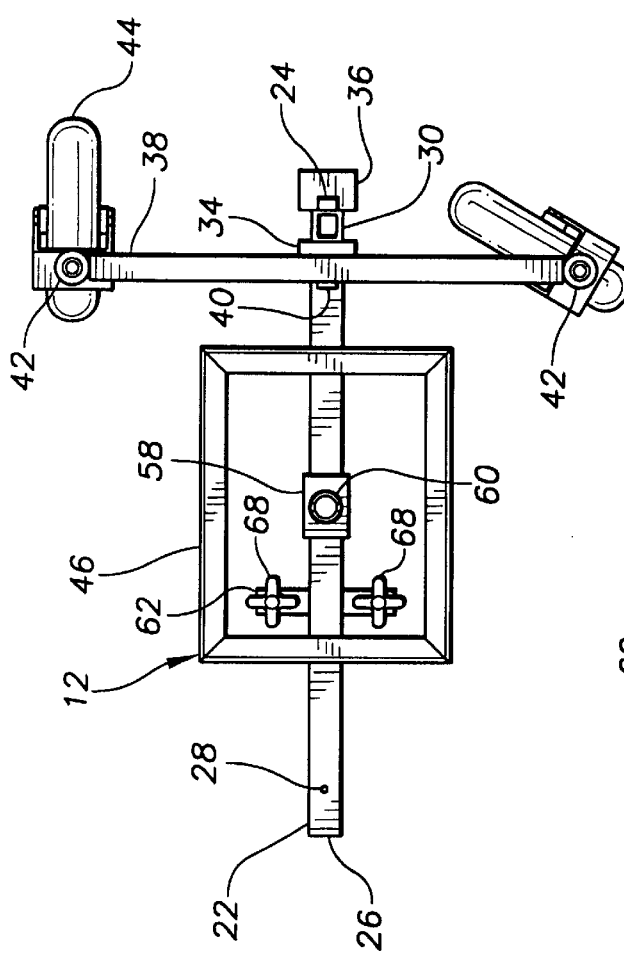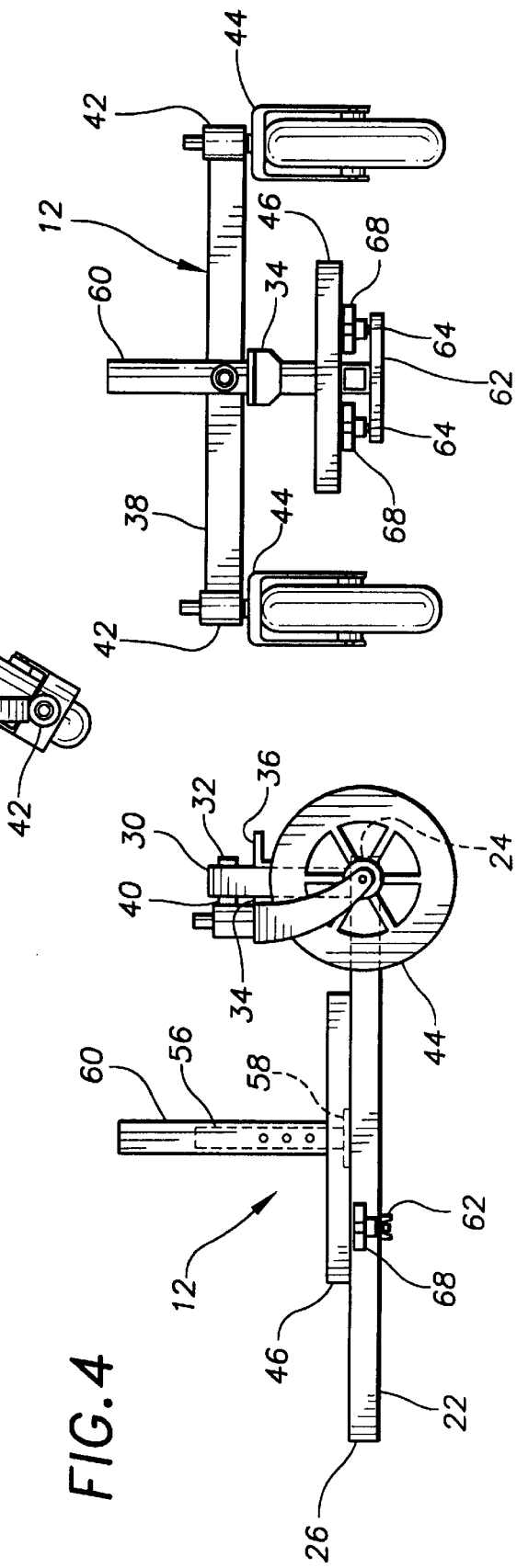

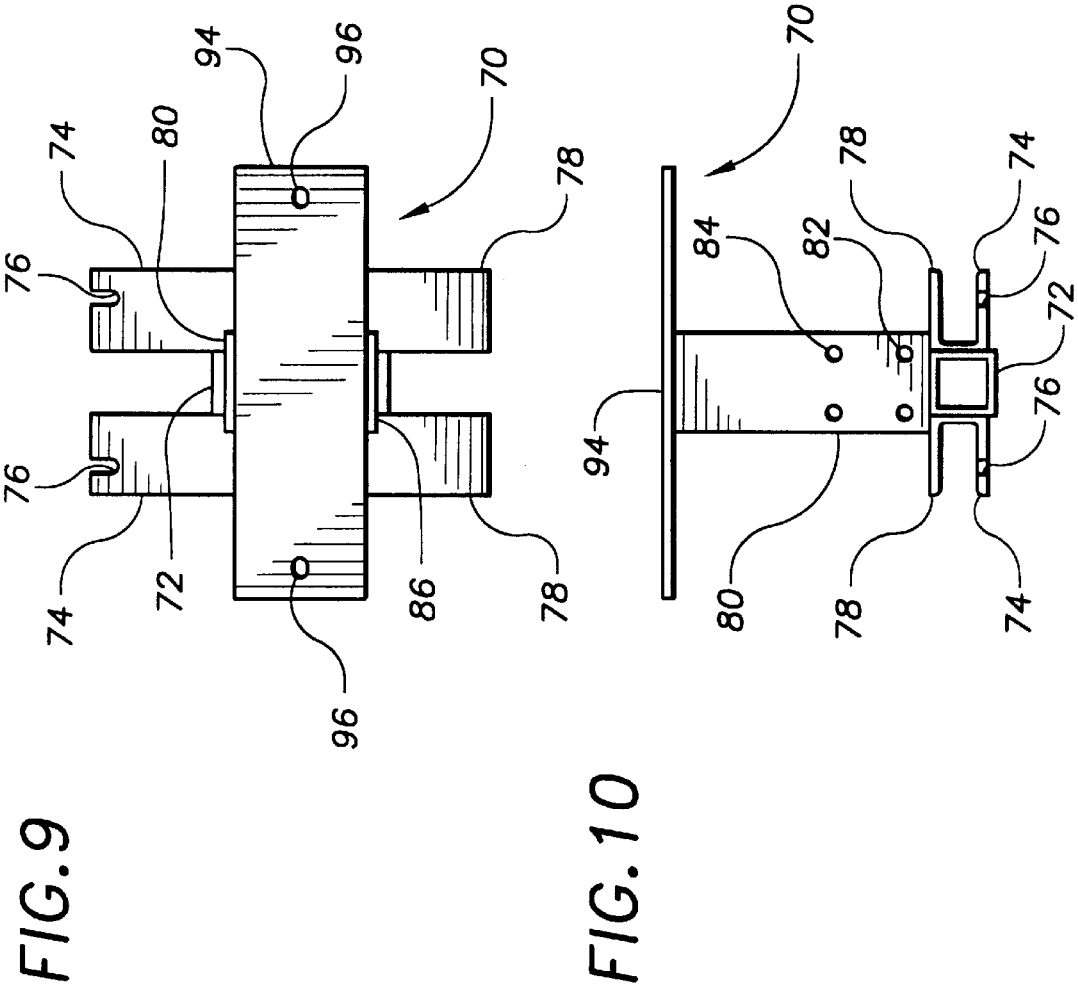

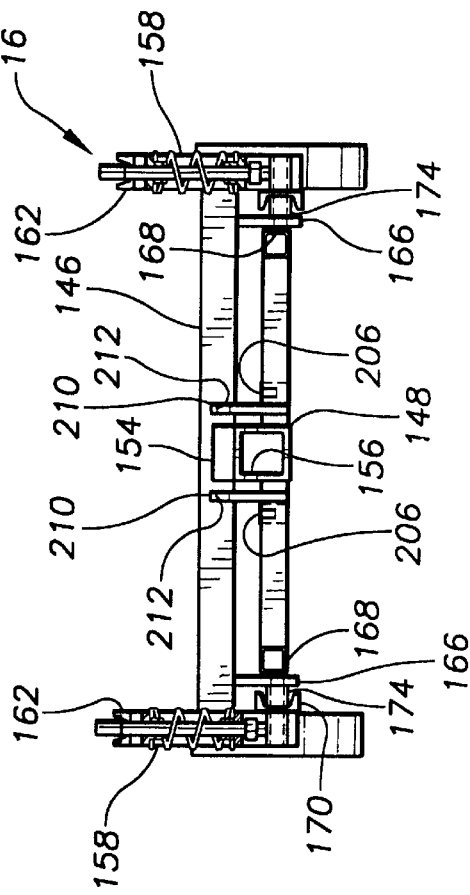
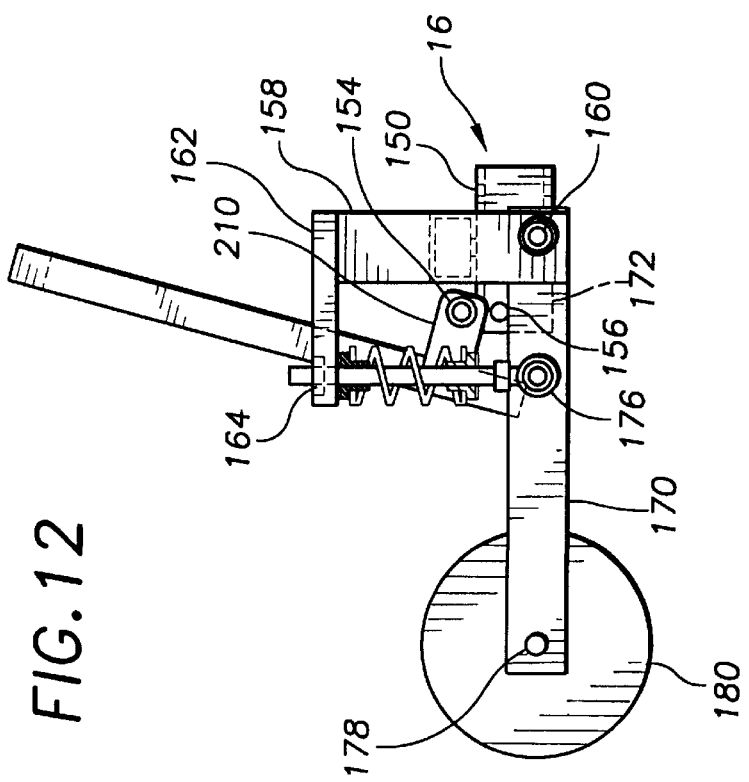
FIG. 13
FIG. 12

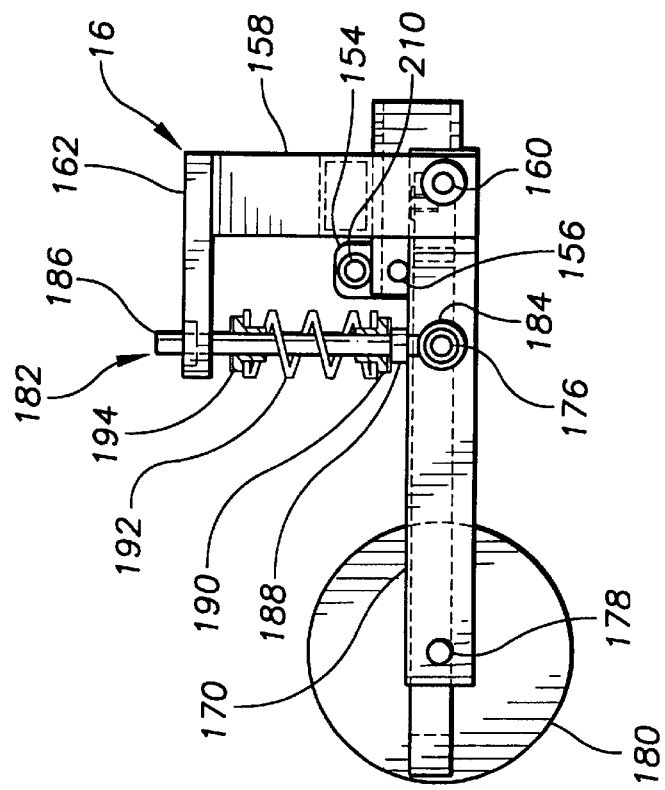
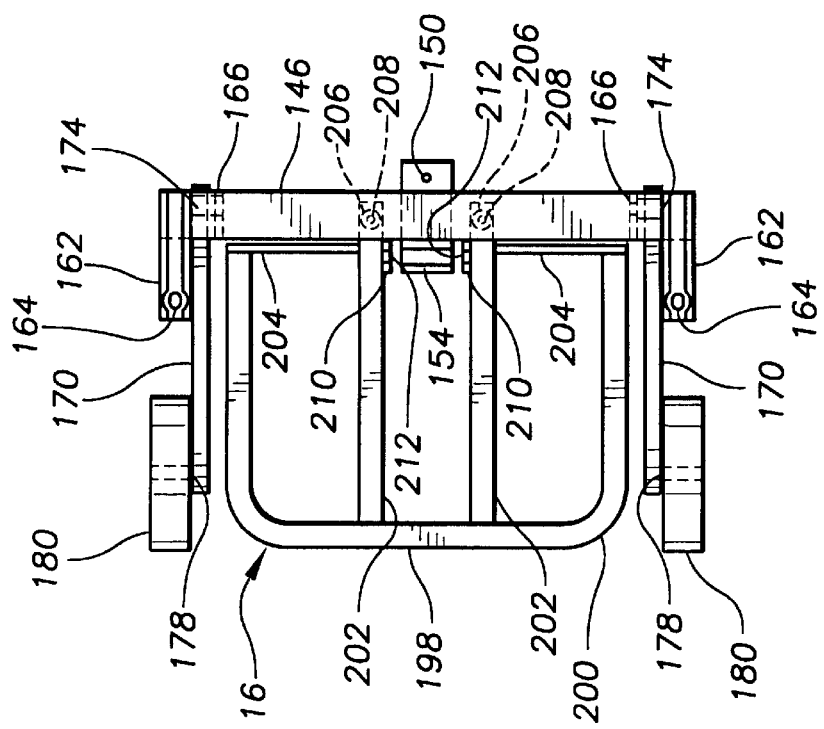

POWERED WHEELCHAIR WITH SEPARATING FRAME

STATEMENT REGARDING FEDERALLY SPONSORED RESEARCH OR DEVELOPMENT

Not Applicable.

CROSS REFERENCE TO RELATED APPLICATIONS

Not Applicable.

BACKGROUND OF THE INVENTION

The present invention relates to a power base, or power wheelchair, for disabled persons that is separable for the purpose of transportation. More specifically, the invention relates to a powered wheelchair that has a separating frame that allows the wheelchair to be easily separated into a number of smaller and lighter weight components for transportation without the use of tools. Another aspect of the present invention relates to a powered wheelchair for disabled persons that has a suspension system for the drive wheels that reduces the amount of fore and aft rotation of the wheelchair about the drive axis.

One of the options available to physically impaired persons is the powered wheelchair. The powered wheelchair offers increased mobility and convenience to these individuals. Powered wheelchairs are now of three basic types: rear wheel drive, front wheel drive, and mid-wheel drive. The mid-wheel drive chair puts the weight of the individual traveling therein directly over the drive wheels, which offers increased traction. Further, the mid-wheel drive vehicle offers a better turning radius. However, one of the problems encountered by users of the mid-wheel drive vehicle is what some refer to as a "seasick" or motion sickness problem.

In a typical mid-wheel drive wheelchair, the drive wheels are located under the trunk of the user. A pair of swivel type rear wheels is provided, which typically remain in contact with the ground at all times. It is also necessary to provide a pair of front, stabilizing wheels, which extend in front of the drive wheels. These wheels typically do not travel on the ground at all times, but rather are located a set distance from the ground. If a user is going down a hill, or the wheelchair is otherwise tipped forwardly, the front wheels prevent the chair from tipping or rotating forwardly beyond a set point. Many of the prior art mid-wheel drive vehicles are also equipped with a suspension system for the drive wheels. In these prior art suspension systems, the drive wheels are allowed to rotate about an axis that is perpendicular to the direction of travel. This type of suspension, along with the elevated front wheels, allows the chair to rock fore and aft when the drive wheels encounter a bump or other rise or fall in the terrain on which the chair is traveling. This fore and aft rocking motion can cause a person riding in the chair to feel uneasy, or seasick. Moreover, if the person riding in the chair does not have sufficient physical control of his or her upper body, such a motion can cause a person to rock forwardly and out of the chair.

Those using powered wheelchairs encounter the need to transport the wheelchair from one location to another, such as in a van or car. There are, therefore, available powered lift systems that can lift the entire chair into a van or other vehicle. However, these systems are typically expensive and can only be installed on vehicles that are large enough to accommodate the assembled chair. To address this problem, some prior art chairs are designed to allow the seat to be removed therefrom, making the chair slightly more transportable. Other components, such as the batteries, may also be removable. Further, some prior art chairs have been equipped with a folding frame, to lessen the overall footprint of the chair. It has been found, however, that the degree of separation and folding possible with the prior art chairs is less than satisfactory. The current degree of separation possible with prior art chairs results in assemblies that are both bulky and heavy. Compounding the problem is the reduced openings available in many vehicle trunks. While the actual trunk space has not been reduced, the opening available has been decreased on certain vehicles. This decreased opening has made it more difficult to get larger, bulkier items into the trunk.

The main frame of these prior art powered wheelchairs typically supports and has affixed thereto the drive wheels along with at least one other set of wheels. Even with the seat removed, such a frame and wheel assembly is both bulky and heavy, resulting in the problems discussed above. Any further disassembly involves the need for tools, which is both inconvenient and time consuming. This decreases the uses to which the wheelchair can be put, and also decreases the versatility of the wheelchair.

Another problem encountered by powered wheelchair users involves the wheelbase of the wheelchair. The length of the wheelbase of a powered wheelchair determines, in part, the turning radius for the wheelchair. A longer wheelbase having a larger turning radius can be advantageous in certain situations. For example, if the wheelchair will primarily be used outdoors, a longer wheelbase offers better stability in outdoor conditions. On the other had, a shorter wheelbase is more advantageous when the wheelchair will be used primarily indoors, the shorter wheelbase offering a better turning radius and thus increased maneuverability. Purchasers of powered wheelchairs have heretofore selected, at the time of purchase, a wheelchair having the wheelbase best suited for their needs. This requires a wheelchair purchaser to elect either a wheelchair that is best used either indoors or outdoors, but not both.

Yet another problem faced by powered wheelchair users involves the ability to get as close as needed to desks and tables, while still in the wheelchair. On a powered wheelchair, the controls are typically located in line with one of the arm rests of the seat for the wheelchair. This arrangement places the controls in line with the user's arm, as his or her arm is resting on the armrest. This placement has been found to be best in that the user's wrist is not required to be at an uncomfortable angle in order to control the speed and direction of the wheelchair. This placement, however, restricts the wheelchair from being positioned as close to a table or desk as may be desired. This restriction is due to the fact that the controls protrude forwardly of the terminal end of the armrest. Prior art chairs have been equipped with controllers mounted so as to be able to rotate the controller assembly out of the way. This rotation, however, involves the use of a somewhat complicated structure.

Therefore, a powered wheelchair for disabled persons is needed that can reduce the amount of fore and aft rocking motion encountered by a user thereof. Further, a powered wheelchair is needed that can be separated for the purposes of transportation into a number of lighter weight and more manageable components without the use of tools. Further, a powered wheelchair is needed that allows the wheelbase thereof to be adjusted, to better accommodate the upcoming use of the wheelchair. A powered wheelchair is also needed that allows the controls to remain positioned in line with the armrest of the seat and that also allows the controls to be recessed under the armrest to allow the chair to be better positioned adjacent a table or desk.

SUMMARY OF THE INVENTION

It is an object of the present invention to provide a powered wheelchair for disabled persons that can be easily disassembled for the purpose of transportation without tools into a number of easily handled components.

It is still another object of the present invention to provide a powered wheelchair for disabled persons that has a suspension system for the drive wheels that restricts fore and aft rotation about the drive axis.

It is a feature of this invention to provide a powered wheelchair that allows the wheelbase thereof to be adjusted in length.

It is yet another feature of this invention to provide a powered wheelchair that allows the controls for the wheelchair to be positioned in line with an armrest on the seat of the wheelchair and that allows the controls to be recessed under the armrest of the chair, allowing the chair to be better positioned adjacent to a desk or table.

According to the present invention, the foregoing and other objects are obtained by a separating powered wheelchair for use by disabled persons. The wheelchair includes a center frame that has a first end and a second end. The wheelchair further has a seat support coupled to the center frame between the first and second ends. A pair of rear stabilizing wheels is connected to the center frame near the first end. The wheelchair further includes a drive assembly that is removably coupled to the center frame near the second end. The drive assembly has a pair of drive wheels that each have a motor operably connected thereto. A coupling mechanism is associated with the frame and the drive assembly that removably couples the frame to the drive assembly. The coupling mechanism is applicable and releasable by hand without the use of any tools. A power source is removably held on the center frame generally between the first and second ends, and is electrically connected to each of the motors. A seat assembly is removably coupled to the seat support that extends upwardly above the center frame. Finally, a controller is provided that allows operation of the drive assembly to be controlled. The joystick of the controller is removably coupled to the seat assembly. The power source, the seat assembly and the joystick of the controller are each removable from the center frame by hand without the use of any tools.

Additional objects, advantages, and novel features of the invention will be set forth in part in the description which follows, and in part will become apparent to those skilled in the practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

In the accompanying drawings which form a part of the specification and which are to be read in conjunction therewith and in which like reference numerals are used to indicate like parts in the various views:

FIG. 3 is a top elevation view of the center frame of the wheelchair of FIG. 1;

FIG. 4 is a side elevation view of the center frame of FIG. 3;

FIG. 5 is a front elevation view of the center frame of FIG. 3;

FIG. 9 is a top elevation view of the base frame of the drive assembly shown in FIG. 8;

FIG. 10 is a front elevation view of the base frame of FIG. 9;

FIG. 11 is a side elevation view of the base frame of FIG. 10;

FIG. 12 is a side elevation view of the footrest assembly of the wheelchair of FIG. 1, shown with the footrest in an elevation position;

FIG. 13 is a front elevation view of the footrest assembly of FIG. 12;

FIG. 14 is a top elevation view of the footrest assembly of FIG. 13;

FIG. 15 is a side elevation view similar to FIG. 12, shown with the footrest in a lowered position;

DETAILED DESCRIPTION OF THE INVENTION

Figure 1:
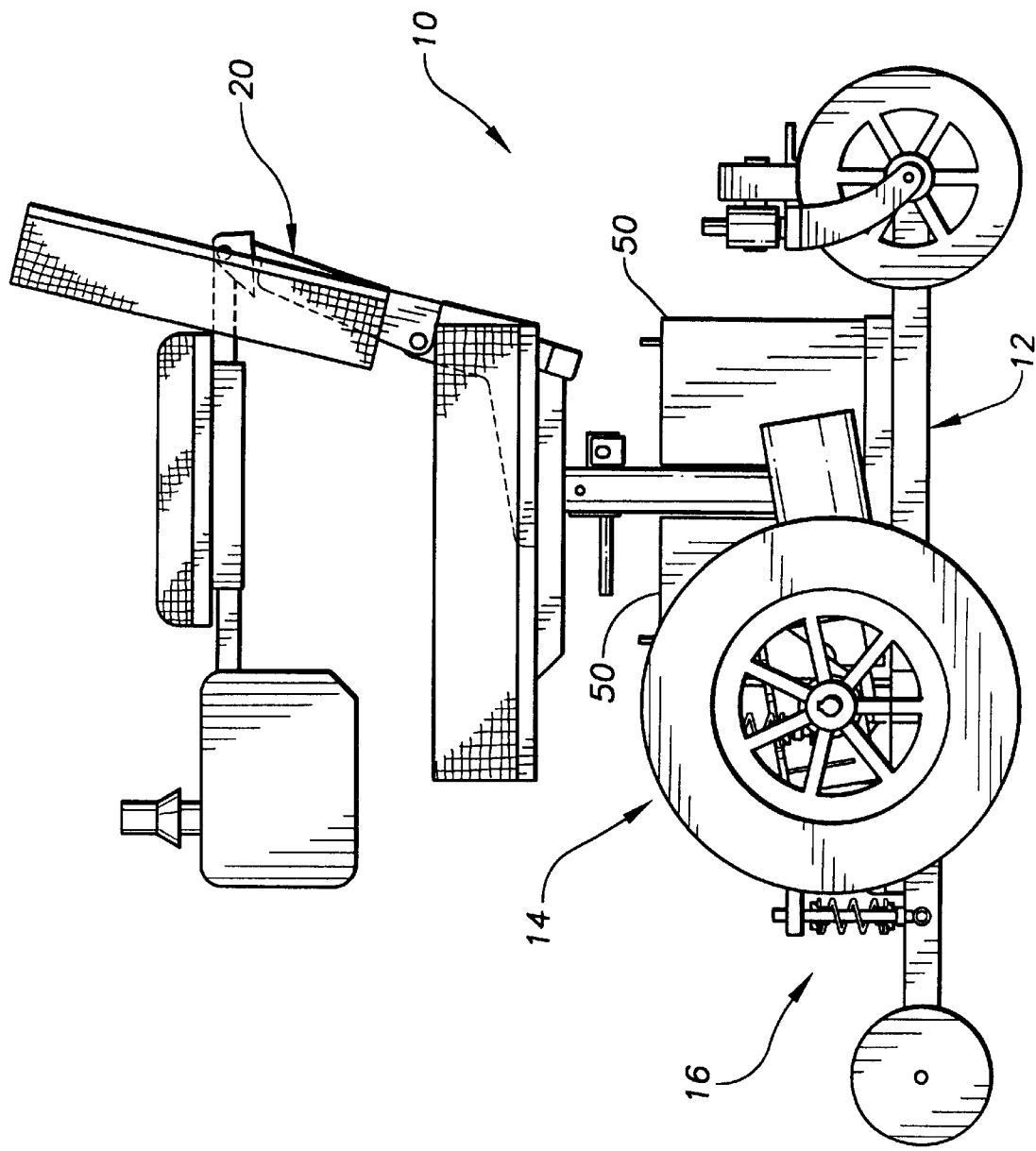
FIG. 1 is a side elevation view of the wheelchair of the present invention, with hidden lines showing.
Figure 2:
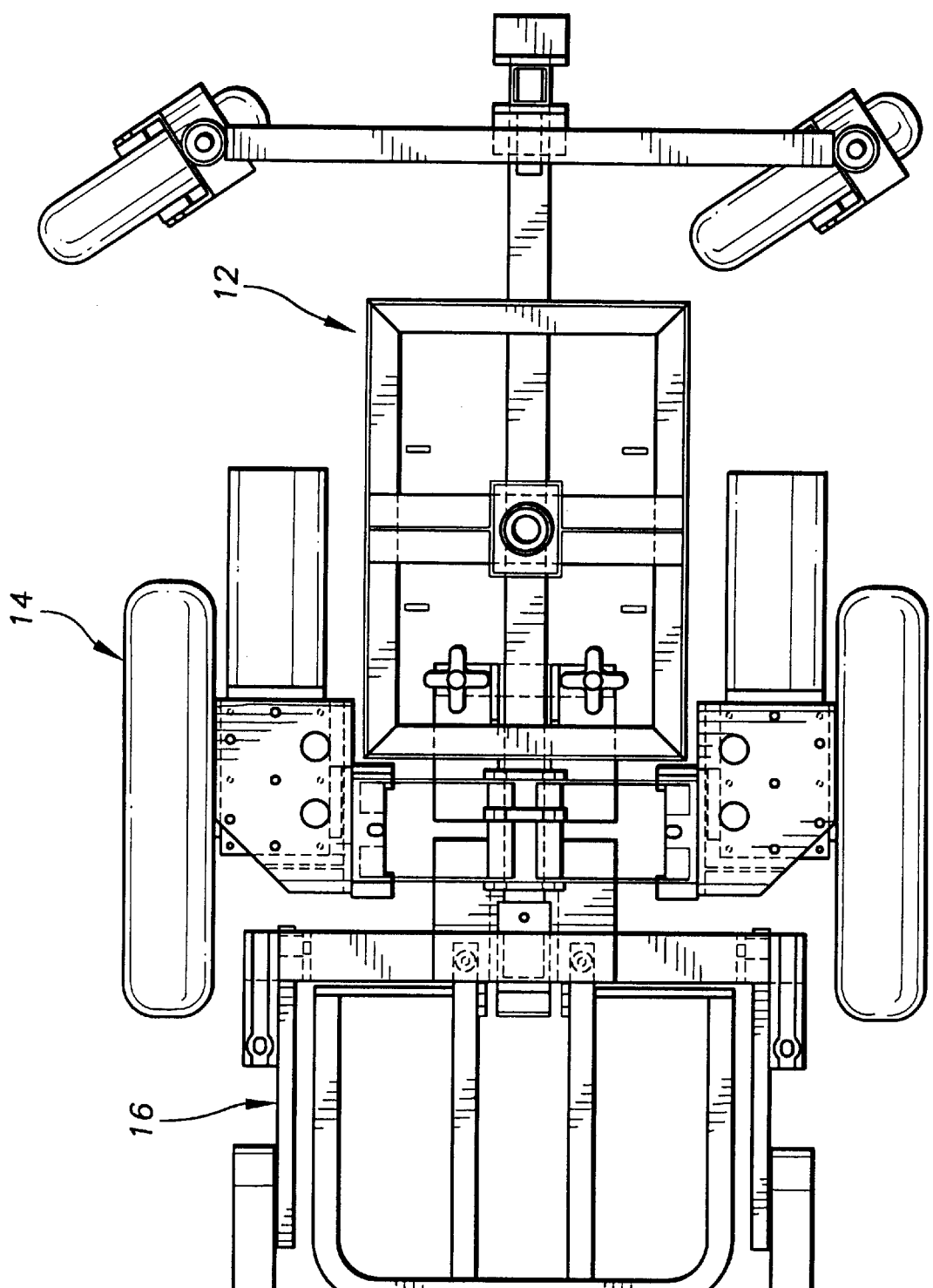
FIG. 2 is a is a top elevation view of the wheelchair of FIG. 1, shown without the seat assembly and with hidden lines showing.

Referring initially to FIGS. 1 and 2, a powered wheelchair embodying the principles of this invention is broadly designated in the drawings by reference numeral 10. Wheelchair 10 is used by disabled persons to travel both inside and outside, and provides disabled persons increased mobility. Wheelchair 10 is separable for the purpose of transportation into a number of easily handled and lighter weight components. The components are separable from wheelchair 10 by hand and without the use of any tools. More specifically, wheelchair 10 has a center frame 12 that is used to couple together frame 12, a drive assembly 14, a footrest assembly 16, a protective shell, and a seat assembly 20. Wheelchair 10 is a three-quarter to front wheel drive type wheelchair. In other words, the axis of rotation of the drive wheels of wheelchair 10 are located forwardly of the seat support post.

As best seen in FIGS. 3–5, frame 12 includes a center support bar 22, preferably made of square, steel tubing, which has a first end 24 and a second end 26. Disposed vertically through bar 22 near second end 26 is a through hole 28. Connected to bar 22 near first end 24, and extending upwardly therefrom, is a vertical support post 30. Preferably, support post 30 is made from a square steel tubing that is welded to bar 22. Extending through post 30 in alignment with support bar 22 is a cylindrical bearing tube 32. Tube 32 is preferably rigidly secured to post 30, such as by welding. Also connected to bar 22 are first and second angle supports 34 and 36 respectively. Supports 34 and 36 are preferably secured to post 30 by welding. Each angled support preferably extends laterally beyond the width of support bar 22, as best seen in FIG. 3.

Also coupled to frame 12, and more specifically post 30, is a horizontal cross member 38. Member 38 has a bearing tube 40 extending through the middle thereof. Tube 40 is preferably rigidly secured to member 38, such as by welding, and is positioned to be in alignment with tube 32 when cross member 38 is affixed to post 30. When tube 32 and tube 40 are in alignment, member 38 is connected to post 30 by passing a bolt through both tubes. On each end of cross member 38 is a cylindrical caster support 42, oriented at a right angle to tube 40. Supports 42 are preferably secured to cross member 38 by welding, and each has coupled thereto a rear swivel caster wheel 44. As shown, each wheel 44 is free to rotate about an axis in the center of support 42. As shown in FIGS. 3–5, member 38 is secured to the inward side of post 30, supported by angle support 34. This position for member 38 offers a shorter wheelbase, which decreases the turning radius, but offers less rearward stability. Member 38 is alternatively positioned on the outward side of post 30, supported by angle support 36. This position for member 38 offers a longer wheelbase, which increases the turning radius, but also offers more rearward stability.

Welded to bar 22 generally midway between first end 24 and second end 26 is a battery tray support 46. Support 46 is a generally rectangular frame made from welded angle iron. Held within the outer perimeter of support 46 is a removable battery tray (not shown). Preferably, the trays are made from a sturdy, plastic material. The trays and support 46 provide the support for a pair of batteries 50, as best seen in FIG. 1. Preferably, two 12 volt batteries 50 are supplied and used. Each battery 50 may be held within support 46 by a holding strap. Further, each battery 50 is preferably equipped with a strap like carrying handle. Extending from the terminals of each battery 50 is an electrical quick disconnect coupling, as is known within the art.

Frame 12 further includes a seat support post 56 that extends upwardly from bar 22. Post 56 preferably has a base plate 58 which is rigidly secured to the top of bar 22, such as by welding. Telescopingly received over the outside of post 56 is a cylindrical tube 60. Tube 60 is bolted to post 56 in one of a number of vertical positions, depending upon the height of the wheelchair user. Tube 60 provides support for seat assembly 20, while allowing the seat to travel up and down axially within tube 60.

As best seen in FIGS. 3–5, located on the underside of bar 22, but generally within the area defined by tray support 46 is a coupling bar 62. Preferably, coupling bar 62 is welded to support bar 22. Bar 62 is perpendicularly oriented with respect to bar 22 and has a hole 64 disposed therethrough near each outer end thereof. Hole 64 may be threaded, or, alternatively, a nut may be axially aligned with each hole 64 and welded to the bottom of bar 62. As best seen in FIGS. 3 and 5, a coupling knob 68 is disposed through each hole 64 and is threaded therein.

Figure 8:
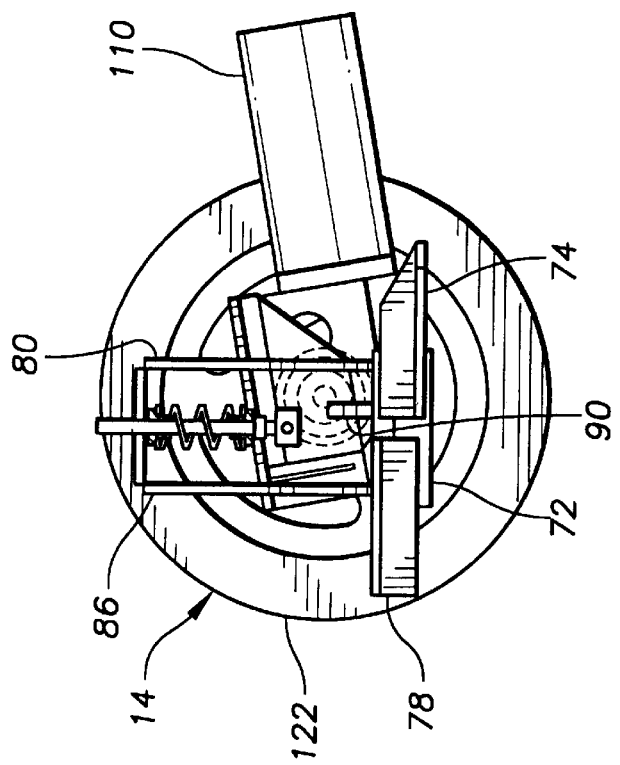
FIG. 8 is a side elevation view of the drive assembly of FIG. 7.
Figure 6:
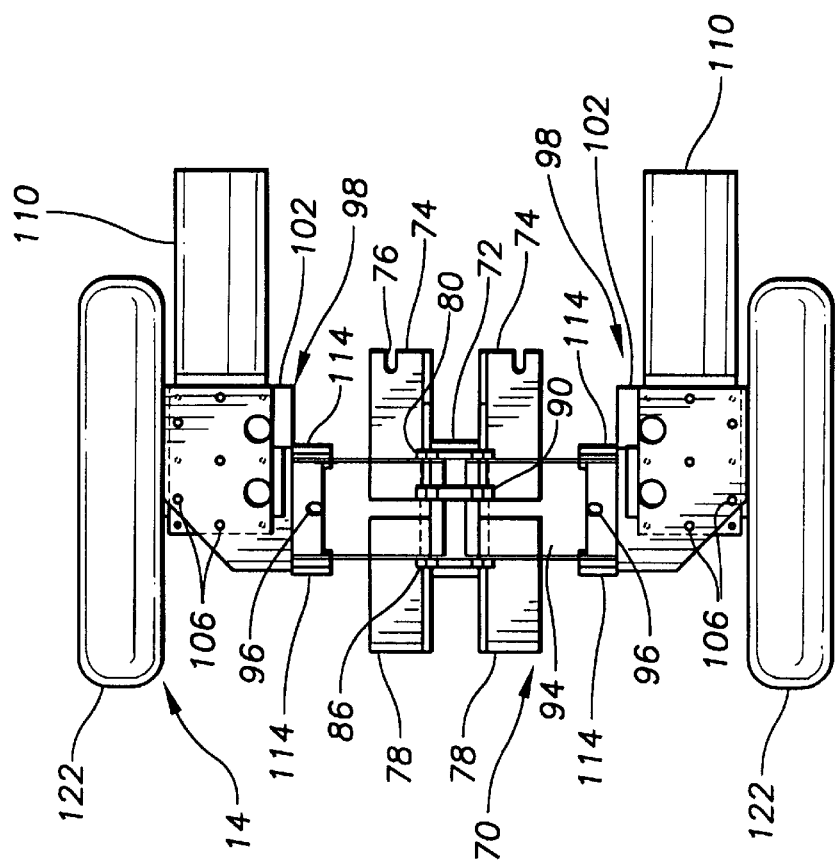
FIG. 6 is a top elevation view of the drive assembly of the wheelchair of FIG. 1.
Figure 7:
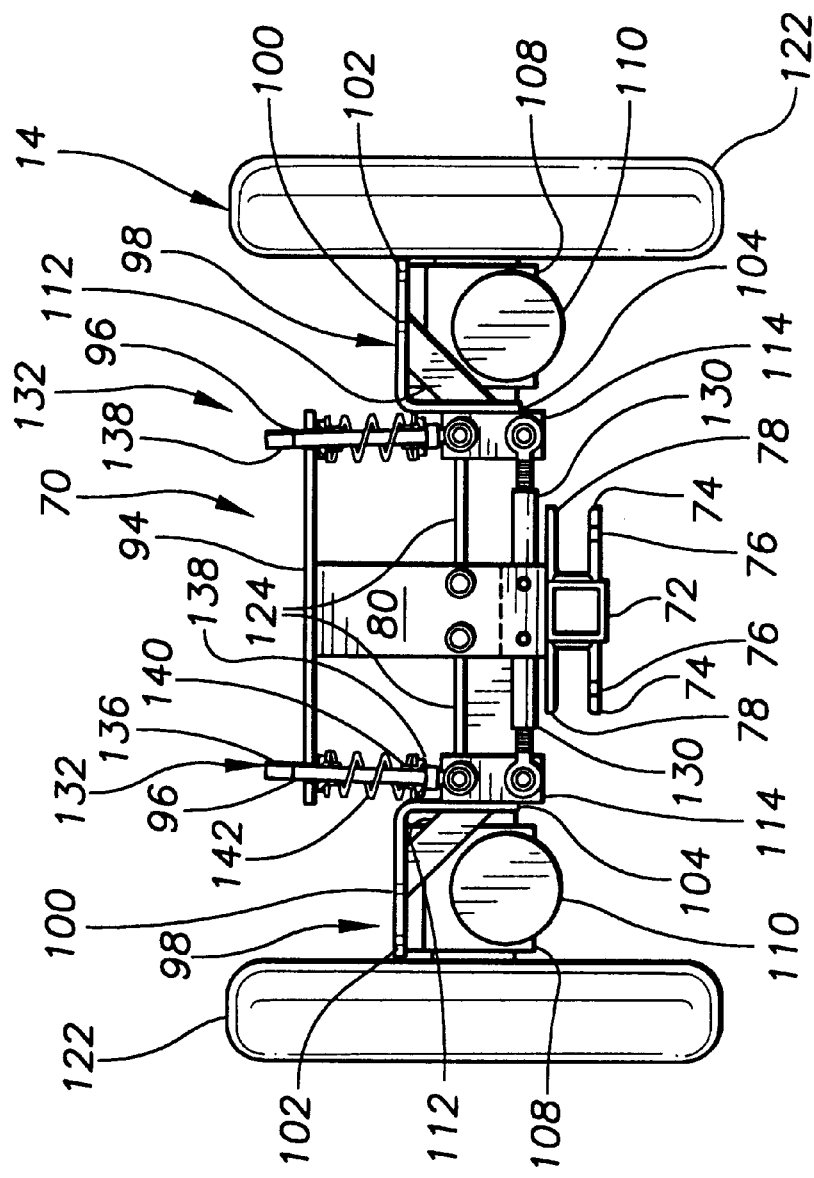
FIG. 7 is a front elevation view of the drive assembly of FIG. 6.

Turning to FIGS. 6–8, drive assembly 14 has a base frame 70 that has a square tube 72 positioned to allow axial alignment with support bar 22. Frame 70 is best seen in FIGS. 9–11. Tube 72 is sized to allow center bar 22 to pass therethrough with only minimal clearance. Welded to tube 72 and extending towards center frame 12 are a pair of coupling angle iron members 74. The outwardly extending vertical portion of members 74 is tapered, as best seen in FIG. 11. Further, the ends of each member 74 distal from tube 72 each have a slot 76 formed therein. It should be understood that holes could be used in place of slots 76, with knobs 68 operating to pass through the holes or be threaded therein. Slots 76 are spaced to matingly fit with coupling knobs 68 and are used to couple drive assembly 14 to center frame 12 as is more fully described below. As best seen in FIG. 11, the lower surface of members 74 is positioned to be flush with the inside wall of tube 72, so that coupling bar 62 passes under members 74. Extending in the opposite direction from members 74 and also welded to square tube 72 is a pair of foot rest support angle iron members 78. As best seen in FIG. 11, the top surface of members 78 is positioned to be flush with the top surface of square tube 72. A first vertical plate 80 is rigidly secured to the top surface of square tube 72 and extends upwardly therefrom. Plate 80 is located near members 74 and has a lower pair of linkage holes 82 and a pair of upper linkage holes 84 disposed therethrough. Spaced from first vertical plate 80 near the opposite end of tube 72, and extending upwardly from tube 72 is a second vertical plate 86. Preferably, plate 86 is welded to the top of tube 72. Plate 86 has disposed therethrough a pair of upper linkage holes 88 that are spaced to be in axial alignment with holes 84. Located between plates 80 and 86 is a third vertical plate 90. Preferably, plate 90 is located nearer to plate 80 than plate 86. Plate 90 is preferably welded to the top of tube 72 and has disposed therethrough a pair of lower linkage holes 92 that are spaced to be in axial alignment with holes 82. Base frame 70 further has a top plate 94 which is welded to the top of plates 80 and 86. Near each outer end of top plate 94 is an oval or elongated hole 96, which is used in conjunction with a suspension system for the drive wheel as is more fully described below.

As best seen in FIG. 7, also included in drive assembly 14 is a pair of motor mounts 98. Each mount 98 has a mount flange 100 that includes a top plate 102 and a side plate 104. Preferably, plates 102 and 104 are formed of one piece of bent steel. Disposed through top plate 102 are a series of mounting holes 106 which are located to couple a gear box 108 and motor 110 to the flange 100. Extending diagonally between top plate 102 and plate 104 is a flat support bar 112 that further supports top plate 102, gear box 108 and motor 110. Welded to side plate 104 are a pair of linkage coupling members 114, which are preferably mounted on to side plate 104 at a 10 degree angle relative to top plate 102 to prevent damage to the motors as the wheelchair is traveling over elevated obstacles, such as curbs, as best seen in FIG. 8. Each coupling member 114 has disposed therethrough a pair of linkage holes. These linkage holes are spaced a distance corresponding to the spacing between holes 82 and 84 on plate 80 and are used to couple mounts 98 to frame 70, as is more fully described below. In use, each gear box 108 is mounted to a corresponding flange 100 by placing bolts through holes 106. Gearbox 108 is operably coupled to motor 110. Each motor 110 has an electrical conduit extending therefrom that has a quick-disconnect type electrical coupling on its terminal end. This coupling matingly fits with a quick-disconnect coupling extending from a controller to electrically couple each motor 110 to the controller. Each gear box 108 has a drive wheel 122 coupled to an output shaft of the gear box. Preferably, wheels 122 are larger than rear wheels 44 and are pneumatic rubber wheels.

Coupled between motor mounts 98 and base frame 70 are a pair of link arms 124. Each link arm 124 has a cylindrical tube welded on each end of a flat bar. The cylindrical tube on the end of link arm 124 nearest motor mount 98 has a gap therein. Arms 124 are pivotally secured between plate 80 and 86 by placing a bolt through upper linkage holes 84 and 88, and through the cylindrical tube in link arm 124. The opposite end of arms 124 is secured to mounts 98 and a spring mount, as is more fully described below. Extending outwardly from base frame 70 below link arms 124 is a pair of turnbuckles 130. Each turnbuckle 130 is secured between plates 80 and 90 by running a bolt through lower linkage holes 82 and 92. The opposite end of turnbuckles 130 is secured to motor mounts 98 by running a bolt through the lower pair of linkage holes in coupling members 114.

Coupling base frame 70, link arms 124 and motor mounts 98 together is a spring mount 132. Each spring mount 132 has a lower cylindrical tube portion which is placed between the gap in the cylindrical tube of link arm 124. Extending upwardly from this tube portion is a vertical rod 136, each end of which is threaded. In assembling drive assembly 14, this lower tube portion is placed between the gap in the cylindrical tube of link arms 124. A bolt is then passed between the upper linkage holes on members 114 and through both the tube portion of link arm 124 and the tube portion of spring mount 132. Each spring mount 132 is thus pivotally coupled to a link arm 124 and a coupling member 114.

A lower stop nut 138 is placed onto the lower end of rod 136 before welding the tube portion to rod 136. In the preferred embodiment, two stop nuts 138 are used. A lower stop washer 140 is then placed on top of nut 138. Disposed around rod 136 is a suspension spring 142, which is placed between washer 140 and top plate 94. The stop nuts 138 can be adjusted up or down to preload spring 142 for the appropriate riding weight of the wheelchair user. Rod 136 extends through plate 94 and more specifically through oval holes 96. Rod 136 can thereafter equipped with a top nut (not shown), which prevents rod 136 from traveling back through oval holes 96. These top nuts are also used to adjust the height of the front of the wheelchair. As the top nuts are threaded downwardly along rod 136, the front of the wheelchair is lowered. In use, it may be desirable to place a rubberized cushioning member between rod 136 and the spring 142 to eliminate the metal on metal noise or squeaking.

The suspension system described above allows the drive wheels 122 to pivot about an axis parallel to the direction of travel of the wheelchair. Through the above arrangement, if one of the drive wheels 122 encounters a bump or other elevation in the terrain, the drive wheel 122 will pivot upwardly, against the bias of spring 142. Due to the parallel linkage formed by arms 124 and turnbuckles 130, wheel 122 will remain generally perpendicular to the surface on which wheelchair 10 is traveling. This suspension assembly helps to eliminate the fore and aft rocking motion encountered by users of prior art chairs.

Turning now to FIGS. 12–15, footrest assembly 16 has a main cross-support 146 which is preferably made of rectangular steel tubing. Rigidly secured to the underside of cross-support 146 and in the center thereof is an orthogonally oriented center coupling 148. Coupling 148 is also preferably a square steel tubing and is preferably welded to support 146. Coupling 148 has a pull-pin hole 150 extending therethrough that aligns with through hole 28 in bar 22 when powered wheelchair 10 is fully assembled, as is more fully described below. Preferably, a ball detent pull-pin is provided and is attached to plate 94 on drive assembly 14 with a chain or other mechanism to prevent it from becoming detached and lost. The pull pin is used to couple footrest 16 and center frame 12 together by placing it through holes 28 and 150. The pull pin is insertable and removable by hand, without the need for any tools. Also attached to coupling 148 is a pivot tube 154 that is preferably welded to coupling 148. Tube 154 is preferably a cylindrical piece of steel tubing. Extending through coupling 148 below and in line with pivot tube 154 is a pivot hole 156. As is more fully described below, pivot tube 154 and pivot hole 156 allow the footrest to be selectively placed in either an upper or lower position to better accommodate the individual riding in wheelchair 10.

Attached to each end of cross-support 146 is an upwardly extending outer leg 158. Legs 158 are preferably welded to cross-support 146. Each outer leg 158 extends both below and above cross-support 146, as best seen in FIG. 13. Disposed through the lower end of each leg 158 is a wheel pivot hole 160. Hole 160 is used to couple a pair of front stabilizing wheels to the footrest assembly, as is more fully described below. Rigidly secured to the top of each leg 158 is an extending arm 162. Arm 162 extends forwardly and away from cross-support 146. Preferably, arms 162 are welded to the top surface of outer legs 158. Disposed through the end of each arm 162 distal from legs 158 is a hole 164.

An inner leg 166 is spaced inwardly from each outer leg 158 and is attached to the underside of cross-support 146. Preferably, legs 166 are welded to cross-support 146. Each inner leg 166 has a wheel pivot hole 168 that is in axial alignment with hole 160. Held within the gap formed between legs 158 and 166 is an outwardly extending wheel arm 170. Arm 170 has a hole 172 extending therethrough. Placed within hole 172 and extending inwardly from arm 170 is a pivot bushing 174 that is preferably rigidly secured to arm 170. Each arm 170 is pivotally secured between legs 158 and 166 by placing a bolt through holes 160 and 168 and through bushing 174. Spaced from hole 172 is a suspension hole 176 and spaced from hole 176 and the outer end of arm 170 is an axle hole 178. As best seen in FIG. 12, a front stabilizing wheel 180 is affixed to each arm 170 by placing the axle of wheel 180 through axle hole 178 and welding it in place. As can be seen, wheels 180 are preferably mounted so as to be normally held a set distance above the surface on which wheelchair 10 is traveling.

As best seen in FIG. 15, a suspension system is provided between arm 162 and wheel arm 170. More specifically, a spring mount 182 is secured between arms 162 and 170. Spring mount 182 operates similarly to mounts 132 on drive assembly 14. More specifically, each mount 182 has a lower cylindrical tube 184 with a vertical rod 186 extending upwardly therefrom. Rod 186 has a lower and an upper threaded area. Mount 182 is secured to arm 170 by placing a bolt through suspension hole 176 and also through lower tube 184 and welding it in place. Secured to the lower threaded area of vertical rod 186 is a lower stop nut 188 that is preferably welded to rod 186. A stop washer 190 is placed on top of nut 188 and a spring 192 is placed on top of washer 190. A top washer 194 is placed on top of spring 192 and under arm 162. The top threaded portion of vertical rod 186 is placed through hole 164 in arm 162. Rod 186 is prevented from moving back through hole 164 by a nut (not shown) which is threaded onto rod 186 and on top of arm 162. These nuts are used to set the height of arms 170. As the nuts are threaded downwardly on rod 186, the corresponding arm 170 will be raised relative to the ground. As with mount 132, a rubberized cushioning member may be placed around rod 186, between rod 186 and spring 192, to reduce the noise caused by contact of spring 92 and rod 186. As described above, wheels 180 are mounted so as not to contact the surface on which the chair is traveling in normal operation. However, wheels 180 extend forwardly of wheelchair 10 and act to stabilize the chair and prevent it from rotating forwardly beyond a set position. Such forward rotation may be encountered, for example, when the wheelchair is traveling down a hill. Moreover, wheels 180 act to stabilize wheelchair 10 when the chair is traveling over a curb, or other obstacles.

Pivotally coupled to coupling 148 is a footrest frame 198, which is shaped to accommodate a rider's feet. Frame 198 has an outer c-shaped portion 200 with a pair of rearwardly extending supports 202 welded thereto. Supports 202 are further coupled to the ends of portion 200 by cross members 204. In the terminal end of each support 202 is placed or welded a threaded nut 206 into which is placed an angle adjusting bolt 208. Welded to each support 202 and extending upwardly therefrom is a pivot arm 210. Arms 210 are placed generally near the outer ends of supports 202. Each pivot arm 210 has a hole 212 extending therethrough which aligns with either pivot tube 154 or pivot hole 156 on coupling 148. A plastic cover (not shown) is placed and held on top of frame 198 which provides the footrest for the rider of wheelchair 10. Footrest frame 198 is pivotally coupled to coupling 148 by placing a bolt through either pivot tube 154 and hole 212 or through pivot hole 156 and hole 212. The spacing provided between pivot tube 154 and hole 156 allows the footrest frame to be either raised or lowered. The angle provided to footrest frame 198 can be adjusted through the use of bolt 208. As bolt 208 is repositioned, the angle of footrest frame 198 is increased as bolt 208 will earlier abut the underside of horizontal flange 78, preventing frame 198 from being lowered further. Bolts 208 operate to stabilize the footrest assembly 16 against frame 12.

Center frame 12, drive assembly 14 and footrest assembly 16 are each relatively lightweight and are of a size that is easily lifted and maneuvered. This allows each component to be easily loaded into the trunk of a car, or easily carried from one location to another. Moreover, the construction of each of the components allows them to be removably coupled together, such that they may be coupled and uncoupled quickly and without the use of tools, while still providing a sturdy base for wheelchair 10. More specifically, in assembling center frame 12, drive assembly 14 and footrest assembly 16, center bar 22 of frame 12 is placed through tube 72 of base frame 70 until knobs 68 are in alignment with slots 76. Knobs 68 can then be rotated so that knobs 68 exert a clamping pressure on angle iron 74, thus eliminating seatpost movement or wobble. Center bar 22 is also passed through center coupling 148 of footrest assembly 16. When the process is complete, pull-pin hole 150 will align with through hole 28 on center bar 22. Thereafter, the pull-pin can be placed through holes 150 and 28, thus securing footrest assembly 16 and drive assembly 14 to center frame 12. In the assembled condition, the pull-pin and coupling knobs 68 prevent center frame 12, drive assembly 14 and footrest assembly 16 from separation. Footrest assembly 16 is provided support not only from center bar 22, but also from footrest angle members 78 on base frame 70. Moreover, center frame 12 is provided additional support not only from square tube 72 but also from center frame angle iron 74 on base frame 70.

Once center frame 12, drive assembly 14, batteries 50 and footrest assembly 16 have been assembled, a protective and decorative shell may be installed thereover, as is known within the art. The shell protects the various components from the elements and also provides a more attractive wheelchair 10. After the shell has been installed, seat assembly 20 is installed.

Figure 18:
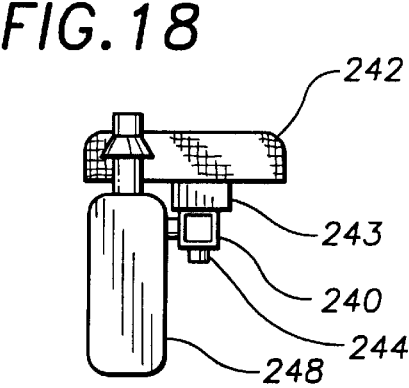
FIG. 18 is a front elevation view of the armrest of FIG. 17.
Figure 16:
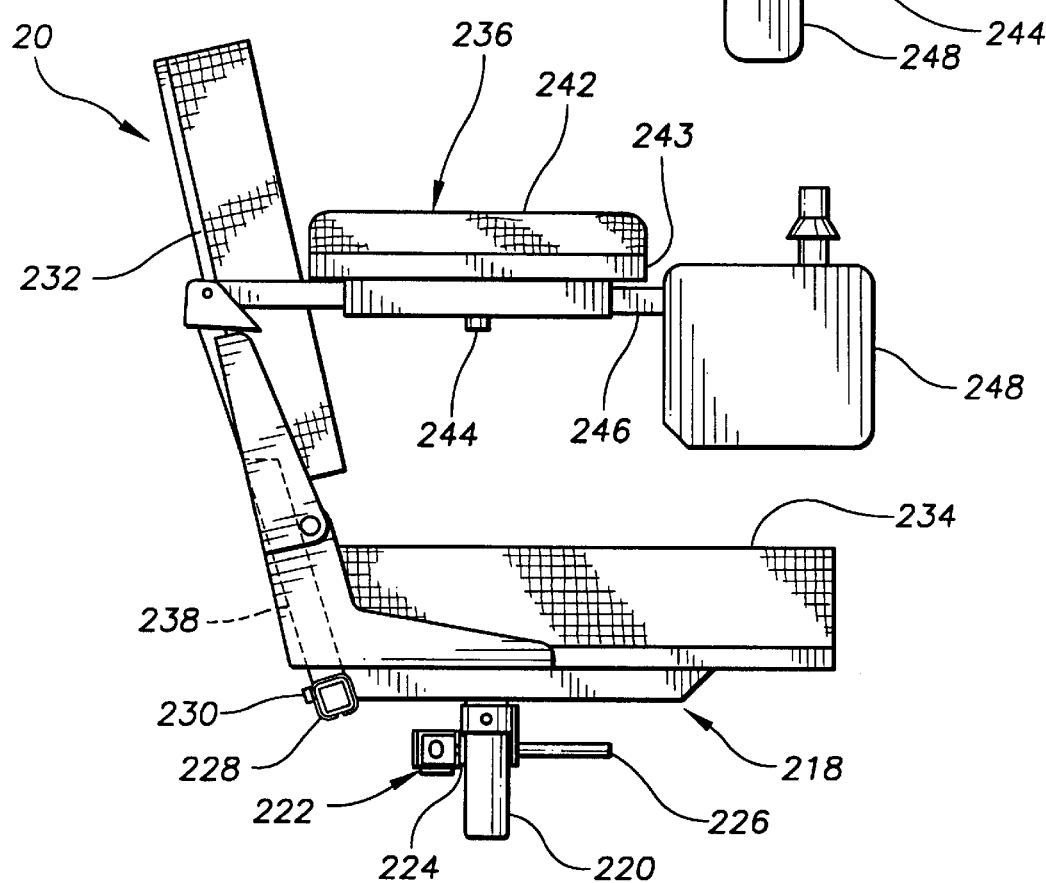
FIG. 16 is a side elevation view of the seat assembly of the wheelchair of FIG. 1.
Figure 17:
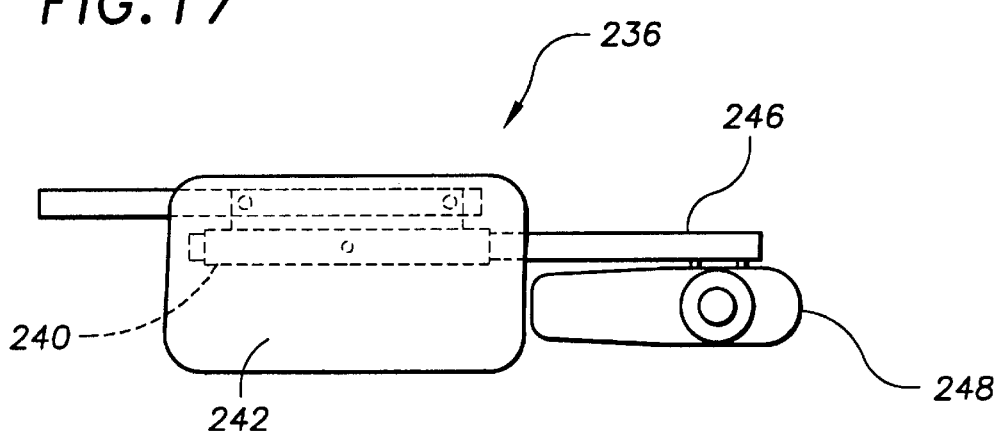
FIG. 17 is a top elevation view of one armrest of the seat assembly of FIG. 16.

Turning now to FIGS. 16–18, seat assembly 20 includes a seat frame 218 to which is secured a cylindrical seat post 220 shaped to be telescopingly received within tube 60 of support 56. Seat post 220 has an associated quick release mechanism 222 coupled thereto which includes a movable clamp 224 and a release arm 226. In operation, release arm 226 moves clamp 224 to secure and release seat post 220 from its position within seat support 56. Mechanism 222 can be used to swivel or rotate seat post 220 with respect to support 56. The degree of rotation may be restricted to allow for movement of only a certain range, such as 180 degrees. Frame 218 further includes a rear support tube 228. Disposed of within tube 228 is a pair of arm rest lock knobs 230. A cushioned seat 234 is provided on top of seat frame 218 as is known within the art, and attached to seat 234 is a seat back 232.

Located generally adjacent seat 234 and extending thereabove is a pair of arm rests 236. Each arm rest 236 has a mounting arm 238, that is shaped to fit telescopingly within tube 228. Arm rests 236 are releasably coupled within tube 228 by lock knobs 230. As best seen in FIG. 16, knobs 230 are equipped with handles so that they are applicable and releasable by hand without the use of tools. If needed or desired, arm rests 236 can therefore be removed from seat frame 218 by merely loosening lock screws 230 and removing arms 238 from tube 228. At least one arm rest 236 is equipped with a joystick or joystick with an integral controller slide mount 240 which is preferably a piece of square tubing. Coupled between mount 240 and a cushioned arm rest portion 242 is a spacer 243. Mount 240 further has a hole disposed therein for a ratcheting clamping lever 244. Telescopingly received within mount 240 is a controller arm 246. Arm 246 is preferably made of square steel tubing side to nest within mount 240. Affixed to the outer arm 246 is a joystick or joystick with an integral controller 248. Controller 248 extends outwardly from arm rest 236 and in-line therewith while wheelchair 10 is being driven. However, if wheelchair 10 is desired to be positioned adjacent a desk or table, controller 248 and control arm 246 can be moved rearwardly by releasing lever 244 and sliding control arm 246 rearwardly within mount 240. As best seen in FIG. 18, cushioned portion 242 is spaced above controller 248 by spacer 243, allowing the controller to slide under the cushioned portion. Controller 248 is electrically connected to batteries 50 and motors 110 to operate the wheelchair as is known in the art. Preferred models for controller 248 include the DX and DL WHEELCHAIR CONTROLLERS, made by Dynamic of Christchurch, New Zealand, because it has been found that they allow for straighter travel on hills. The electrical connection between controller 248, batteries 50 and motors 110 is equipped with a quick-disconnect type connection to allow controller 248 and its associated arm rest 236 to be removed from wheelchair 10 during disassembly.

Seat assembly 20 and center frame 12 may be equipped with a power seat, which allows the height of seat 234 to be raised and lowered automatically. When a power seat is installed, cross-member 38 must be moved to an outward position, supported by angle support 36. This allows for a larger battery tray support 46, due to the increased space requirements of the power seat.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A powered wheelchair separable for the purpose of transportation for use by disabled persons, comprising:
   a center frame having a first end and a second end;
   a seat support coupled to said center frame between said first end and said second end;
   a pair of rear stabilizing wheels connected to said center frame proximate said first end;
   a drive assembly removably coupled to said center frame proximate said second end, said drive assembly including a pair of drive wheels each having a motor operably connected thereto;
   a coupling mechanism associated with said frame and said drive assembly, said coupling mechanism removably coupling said frame to said drive assembly, said mechanism being applicable and releasable by hand without the use of any tools;
   a power source removably held on said center frame generally between said first end and said second end;
   a front foot plate assembly having a pair of front wheels coupled thereto, said foot plate assembly removably coupled to said center frame and said drive assembly proximate said second end;
   a second coupling mechanism associated with said frame and said foot plate assembly, said second coupling mechanism removably coupling said frame to said foot plate assembly, said second mechanism being applicable and releasable by hand without the use of any tools
   a seat assembly removably coupled to said seat support and extending upwardly above said center frame, said seat assembly including a seat coupling mechanism that removably couples said seat assembly to said seat support, said seat coupling mechanism being applicable and releasable by hand without the use of any tools; and
   a control means for controlling operation of said drive assembly, said control means being removably coupled to said seat assembly, said power source being electrically connected to said control means,
   wherein said center frame has a center bar, said center bar having a pair of spaced and parallel sidewalls, and wherein said drive assembly has a pair of spaced and parallel supports, said supports being spaced slightly greater than said side walls, said center bar being located and secured between said supports by said first coupling mechanism when the wheelchair is in an assembled condition.

2. The wheelchair of claim 1, wherein said foot plate assembly includes a connecting end shaped to matingly connect with said center bar, said connecting end having a first hole passing therethrough, and wherein said second coupling mechanism includes a second hole passing through said center bar proximate said second end and located to align with said first hole, said coupling mechanism further including a releasable pull pin disposed through said first and second holes when the wheelchair is in an assembled condition.

3. The wheelchair of claim 2, wherein said first coupling mechanism includes a pair of slots in said supports and a pair of knobs connected to said center bar, said first coupling mechanism further including a pair of fixed nuts corresponding to said knobs, said knobs spaced to align with said slots and spaced from said nuts to allow said supports to pass therebetween, said knobs and nuts cooperating to secure said frame to said drive assembly.

4. The wheelchair of claim 1, wherein said drive wheels each have a common axis of rotation, and wherein said drive wheels are pivotally coupled to said drive assembly to pivot about an axis that is orthogonally oriented with respect to said axis of rotation of said drive wheels.

5. The wheelchair of claim 4, wherein said connection between said power source and said motors includes a quick disconnect, said disconnect applicable and releasable by hand and without the use of any tools.

6. The wheelchair of claim 1, wherein said seat assembly includes a pair of arm rests, at least one of said arm rests having a control arm housing and a control arm that is shaped to be telescopingly received within said housing, and wherein said control means is coupled to said control arm, wherein said control arm is movable within said housing allowing said control arm to be nested within said housing and out of the way of objects in front of the wheelchair.

7. The wheelchair of claim 6, wherein said wheelchair is a three quarter-to-front wheel drive wheelchair, said drive wheels being located generally in-line with the torso of the person traveling in the wheelchair and seated on said seat assembly.

8. A three-quarter to front wheel drive separating powered wheelchair for use by disabled persons, comprising:
   a center frame having a center bar with a first end and a second end, said center bar having a pair of spaced and parallel sidewalls;
   a seat support coupled to said center frame between said first end and said second end;
   a pair of rear stabilizing wheels connected to said center frame proximate said first end;
   a drive assembly removably coupled to said center frame proximate said second end of said center bar, said drive assembly including a pair of drive wheels each having a motor operably connected thereto, said drive assembly further including a pair of spaced and parallel supports, said supports being spaced slightly greater than said side walls of said center bar;
   a coupling mechanism associated with said frame and said drive assembly, said coupling mechanism removably coupling said frame to said drive assembly, said mechanism being applicable and releasable by hand without the use of any tools, said center bar being located and secured between said supports by said coupling mechanism when the wheelchair is in an assembled condition;
   a power source removably held on said center frame generally between said first end and said second end, said power source being electrically connected to said motors;
   a seat assembly removably coupled to said seat support and extending upwardly above said center frame, said seat assembly including a seat coupling mechanism that removably couples said seat assembly to said seat support, said seat coupling mechanism being applicable and releasable by hand without the use of any tools; and
   a control means for controlling operation of said drive assembly, said control means being removably coupled to said seat assembly.

9. The wheelchair of claim 8, further comprising:
   a front foot plate assembly having a pair of front wheels coupled thereto, said foot plate assembly removably coupled to said center frame and said drive assembly proximate said second end; and
   a second coupling mechanism associated with said frame and said foot plate assembly, said second coupling mechanism removably coupling said frame to said foot plate assembly, said second mechanism being applicable and releasable by hand without the use of any tools.

10. The wheelchair of claim 9, wherein said first coupling mechanism includes a pair of slots in said supports and a pair of knobs connected to said center bar, said first coupling mechanism further including a pair of fixed nuts corresponding to said knobs, said knobs spaced to align with said slots and spaced from said nuts to allow said supports to pass therebetween, said knobs and nuts cooperating to secure said frame to said drive assembly.

11. A powered wheelchair separable for the purpose of transportation for use by disabled persons, comprising:

a center frame having a first end and a second end;

a seat support coupled to said center frame between said first end and said second end;

a pair of rear stabilizing wheels connected to said center frame proximate said first end;

a drive assembly removably coupled to said center frame proximate said second end, said drive assembly including a pair of drive wheels each having a motor operably connected thereto;

a coupling mechanism associated with said frame and said drive assembly, said coupling mechanism removably coupling said frame to said drive assembly, said mechanism being applicable and releasable by hand without the use of any tools;

a power source removably held on said center frame generally between said first end and said second end;

a seat assembly removably coupled to said seat support and extending upwardly above said center frame, said seat assembly including a seat coupling mechanism that removably couples said seat assembly to said seat support, said seat coupling mechanism being applicable and releasable by hand without the use of any tools;

a control means for controlling operation of said drive assembly, said control means being removably coupled to said seat assembly, said power source being electrically connected to said control means.

a vertical post secured to said center frame proximate said first end and extending upwardly therefrom;

a first and a second angle support secured to said vertical post distal from said frame, said first support extending outwardly from said post towards said second end and said second support extending outwardly from said post away from said second end; and a horizontal cross member having said rear wheels connected thereto, said cross-member being coupled to said vertical post in either a first position nearer said second end and supported by said first support or a second position nearer said first end and supported by said second support, wherein the wheelbase of the wheelchair may be adjusted by changing the position of said horizontal cross member.

\* \* \* \* \*